(12) United States Patent
Linden

(10) Patent No.: US 6,882,968 B1
(45) Date of Patent: Apr. 19, 2005

(54) METHOD OF MEASURING PERFORMANCE OF AN EMULATOR AND FOR ADJUSTING EMULATOR OPERATION IN RESPONSE THERETO

(76) Inventor: Randal N. Linden, Los Angeles, CA (US)

(*) Notice: Subject to any disclaimer, the term of this patent is extended or adjusted under 35 U.S.C. 154(b) by 369 days.

(21) Appl. No.: 09/696,366

(22) Filed: Oct. 25, 2000

Related U.S. Application Data
(60) Provisional application No. 60/161,326, filed on Oct. 25, 1999.

(51) Int. Cl.[7] ............................. G06F 9/455; G06F 1/08
(52) U.S. Cl. .......................... 703/26; 713/500; 714/47
(58) Field of Search .......................... 703/26, 22, 28; 713/500; 717/138, 130; 714/47, 57, 37

(56) References Cited

U.S. PATENT DOCUMENTS

| | | | |
|---|---|---|---|
| 5,103,394 A | * 4/1992 | Blasciak | 395/575 |
| 5,666,519 A | * 9/1997 | Hayden | 395/500 |
| 5,678,028 A | * 10/1997 | Bershteyn et al. | 395/500 |
| 5,737,579 A | * 4/1998 | Kimura et al. | 395/500 |
| 5,761,477 A | * 6/1998 | Wahbe et al. | 395/406 A |
| 5,815,688 A | * 9/1998 | Averill | 395/500 |
| 6,047,381 A | * 4/2000 | Klein | 713/501 |

* cited by examiner

Primary Examiner—Thai Phan

(57) ABSTRACT

A method which simulates the operating speed of an emulated target system with a consistent rate of instruction execution on a plurality of host systems with varied and variable instruction execution speeds. An arbitrary "time quantum" is selected as a referent and is multiplied by the target's speed of instruction cycle execution to determine the quantity of instructions the target system executes in the specified time period. When non-native code is executed on the host system, a counter is used to track the number of instructions executed and to interrupt when that target quantity is reached. A processor-activity-independent timing source is queried to determine the time elapsed; that measurement is then compared to the original "time quantum." The resulting ratio is a timing reference that is independent of the operating speed characteristics of any particular host system. This reference is used to predict the operational speed of the host system and to adjust factors in the host computer and emulation process to more accurately match the target system before executing the next block of instructions and repeating the process. In certain embodiments, the time quantum is dynamically adjusted to avoid sampling frequencies, which may conflict or resonate with timing frequencies of other system activities or to place a greater or lesser load on the host system. This process results in more consistent, accurate simulation of the target system's speed on a variety of host system configurations, within the limitations and flexibility of the host environment.

16 Claims, 4 Drawing Sheets

METHOD OF MEASURING PERFORMANCE OF AN EMULATOR AND FOR ADJUSTING EMULATOR OPERATION IN RESPONSE THERETO

CROSS-REFERENCE TO RELATED APPLICATIONS

This application claims the benefit of the filing dated of U.S. Provisional Patent Application No. 60/161,326 filed Oct. 25, 1999, the disclosure of which is hereby incorporated herein by reference.

FIELD OF INVENTION

This invention relates to a method of measuring performance of an emulator and for adjusting emulator operation in response thereto.

BACKGROUND OF THE INVENTION

The process of emulating the functionality of a first computer platform (the "target system") on a second computer platform (the "host system") so that the host system can execute programs designed for the target system is known as "emulation." Emulation has commonly been achieved by creating software that interprets and translates programs designed for the target platform into the native-language of a host platform, thus achieving compatibility. More recently, emulation has also been realized through the creation of "virtual machines," in which the target platform's physical architecture—the design of the hardware itself—is replicated via a virtual model in software.

While both methods can emulate the functionality of the target platform on host systems, they do so with varying degrees of performance. It's not uncommon for an emulator to run programs much slower on the host system than on the target system, depending on the complexity of the target system and executable code relative to the host system. The burden placed on the host system in first interpreting instructions written for an entirely different kind of machine, then executing those instructions within its own architecture, is enormous. Often the host system simply does not have enough power to do the extra work adequately at a speed comparable to the target system.

Conversely, some emulators can operate too quickly on host systems. In some cases, the greatly accelerated instruction execution speed of newer processors means they can execute the instructions required for emulation, plus the instructions of the non-native software, and still outpace the target system running the same software.

Inconsistent emulation performance is also a problem where target and host systems not only require different instruction languages, but also different microprocessor architectures and means of executing instructions. For example, Reduced Instruction Set Computing (RISC) @ processors use one processor cycle to perform an instruction, while Complex Instruction Set Computing (CISC) processors can require ½, 3, 6, even 10 or more processor clock cycles to execute an instruction.

In addition, the explosion in the personal computer industry has led to a near-infinite number of possible configurations of host systems within a given platform, each with vastly different performance characteristics. In a "sealed-box" system, the hardware configuration is locked and consistent from machine to machine. But in open systems, there are a multitude of interfaces, and thousands of different devices that can connect to each, with different effects on the host system.

The task of emulation becomes even more complex when performed on host platforms with higher-level operating systems (like Microsoft® Windows™). Where most older systems were designed to do just one job at a time, some modern operating systems are "multi-tasking." That means they can perform several operations concurrently by constantly "handing off" control of the processor from one task to another in a manner that is beyond the control of the emulation software. The operating system can interrupt the execution of timing-critical instructions in mid-stream to share processor cycles with another program, in effect "stealing" needed cycles from the emulator.

And finally, the differences between the complex architectures of target platforms and the hosts on which they are emulated may require that the functionality of several co-processors in the target platform be emulated within a single processor on the host system. The host system may perform all functions of the target within a single processor, or assign certain functions to parallel co-processors within its own architecture for greater speed. When the target's processors operate in parallel, an interrupt signal from the CPU is generally required to pause processor operation and to allow the processors to output their results. The host's CPU cannot generate the necessary interrupt for a coprocessor on the host system until those operations are completed, resulting in inefficient emulation and inconsistent timing due to the introduction of unnecessary "wait times" wherein a coprocessor on the host system may be finished with its task, but unable to progress to the next task until an interrupt is received.

This variance may be less noticeable—or even desirable—in programs like word processors and spreadsheets, but becomes all-important when dealing with timing-critical operations like: (1) sound and video playback; (2) processing "streaming" information, where data is delivered to the processor at a constant rate; and (3) games and animations which require screen updates to display motion accurately.

Maintaining timing accuracy is a simple process when writing native code for a computer platform with consistent timing characteristics. The following is an example of rendering an object moving through space at a consistent rate of 60 ft/sec.

A "virtual world" is described in the code, with whatever "real world" physical rules the programmer chooses to include—motion, acceleration, gravity, inertia, etc. Objects can be defined and acted upon within this virtual world, and the results displayed via the monitor to the "real world". This virtual world's scale, scope and "physical laws" are defined, and the characteristics of an object are described in terms of shape, lighting, color, etc.

The timing of display output and other concurrent processes like sound and disk access are maintained by an "interrupt" signal whose frequency is consistent and determined according to the purpose and timing characteristics of the target platform. For example, if the system has a consistent speed of instruction execution and a known screen-refresh rate (i.e., the rate at which it redraws the information on the monitor) of 60 frames/sec, the instructions that are describing motion as a function of time in the virtual world are linked to the rate at which the system operates and interrupts may be linked to rate at which the image is updated and displayed in the real world. If the object is to move 60 ft/sec, and the system redraws to the monitor at exactly 60 frames/sec, the code instructs the object to "move" one foot per screen refresh/interrupt, so that in one second of real time, the object will appear to have moved 60 feet, as shown in FIG. 1. If the instructions required to prepare the updated image and perform concurrent activities are completed before the interrupt is generated, the results are held in memory until called on, when processing begins on the next set of instructions. If the required instructions cannot be executed in time before the next interrupt is received, the programmer adjusts the code to operate within the limitations of the system.

For the reasons described above, emulation on a host platform in which timing characteristics not only vary from system to system, but are variable within any given system, can result in wildly inconsistent results. (See also discussion below in connection with FIGS. 2 and 3.)

The present invention addresses these issues and provides a method for simulating the timing characteristics of a target platform designed for consistent instruction execution speed by measuring, predicting and dynamically adjusting for timing variability within a host platform, regardless of variations in the timing characteristics of individual host systems, within the limitations and flexibility of the operating environment.

SUMMARY OF THE INVENTION

In summary, the present invention is a method for dynamically analyzing and optimizing the performance of an emulator on a host platform relative to the benchmark performance of a target platform, which processes instructions at a consistent, measurable rate. This method produces more consistent and accurate output relative to the target platform, independent of timing characteristics of individual host systems.

In order to achieve more accurate emulation speed on the host platform, it is necessary first to define an arbitrary period of time, or Benchmark Time Quantum (BTQ), which defines the frequency at which the speed of emulation will be measured and optimized. We then compute the number of instructions the target system can execute in this period, referred to as the Benchmark Instruction Quantum (BIQ). The arbitrary starting BTQ and resulting BIQ may vary for different platforms, depending on the target and host platforms and the nature of the code to be executed.

When neon-native code is executed on the host system, a counter is used to track the number of instructions executed and to interrupt when that target quantity is reached. A processor-activity-independent timing source is queried to determine the time elapsed; that measurement is then compared to the original "time quantum." The resulting ratio is a timing reference that is independent of the operating speed characteristics of any particular host system. This reference is used to predict the operational speed of the host system and to adjust factors in the host computer and emulation process to more accurately match the target system before executing the next block of instructions and repeating the process.

In particular, the method for simulating an operating speed of processing in an emulated target system corresponding to a rate of execution of instruction cycles on at least one host system includes the step of defining a benchmark sample by selecting a reference determined by an arbitrary time quantum. Subsequently, the reference is multiplied by the rate of execution of instruction cycles. The method also tracks the instruction cycles executed and determines whether a threshold value has been exceeded. Furthermore, the method then interrupts the processing activity when a threshold value has been exceeded. The methodology then determines an elapsed time period by querying a timing source which is associated with the host system, which is also unaffected by the processing. The method also determines a timing reference by comparing the elapsed time with the time quantum, and uses the timing reference to adjust the rate so as to simulate the operating speed of the target system.

That is, for every block of code pertaining to the number of instructions established by the bench mark time quantum, the present invention compares the amount of time taken to execute commands on the host system in real time to the benchmark amount of time it would take to process such commands on the target system.

DETAILED DESCRIPTION OF THE INVENTION

Because the target platform in this example has a consistent instruction execution rate, the number of commands executed in one second is roughly equal to the "clock speed" of the processor. The speed of the processor is usually rated in Megahertz, or millions of cycles per second. For example, a 66 Mhz RISC processor executes 66,000,000 instructions per second.

In order to achieve more accurate emulation speed on the host platform, it is necessary first to define an arbitrary period of time, or Benchmark Time Quantum (BTQ), which defines the frequency at which the speed of emulation will be measured and optimized. We then compute the number of instructions the target system can execute in this period, referred to as the Benchmark Instruction Quantum (BIQ). The arbitrary starting BTQ and resulting BIQ may vary for different platforms, depending on the target and host platforms and the nature of the code to be executed. For purposes of this example, we will select a BTQ of $\frac{1}{60}^{th}$ of a second—a logical starting point for many multimedia applications, as video is optimally displayed at 60 frames per second.

To calculate the BIQ the following Equation (1) is used:

$$\text{Processor Speed} \times BTQ = BIQ \tag{1}$$

For this example, 66,000,000×⅙₀ sec=1100000 instructions are executed on the target system every $60^{th}$ of a second.

Figure 5:
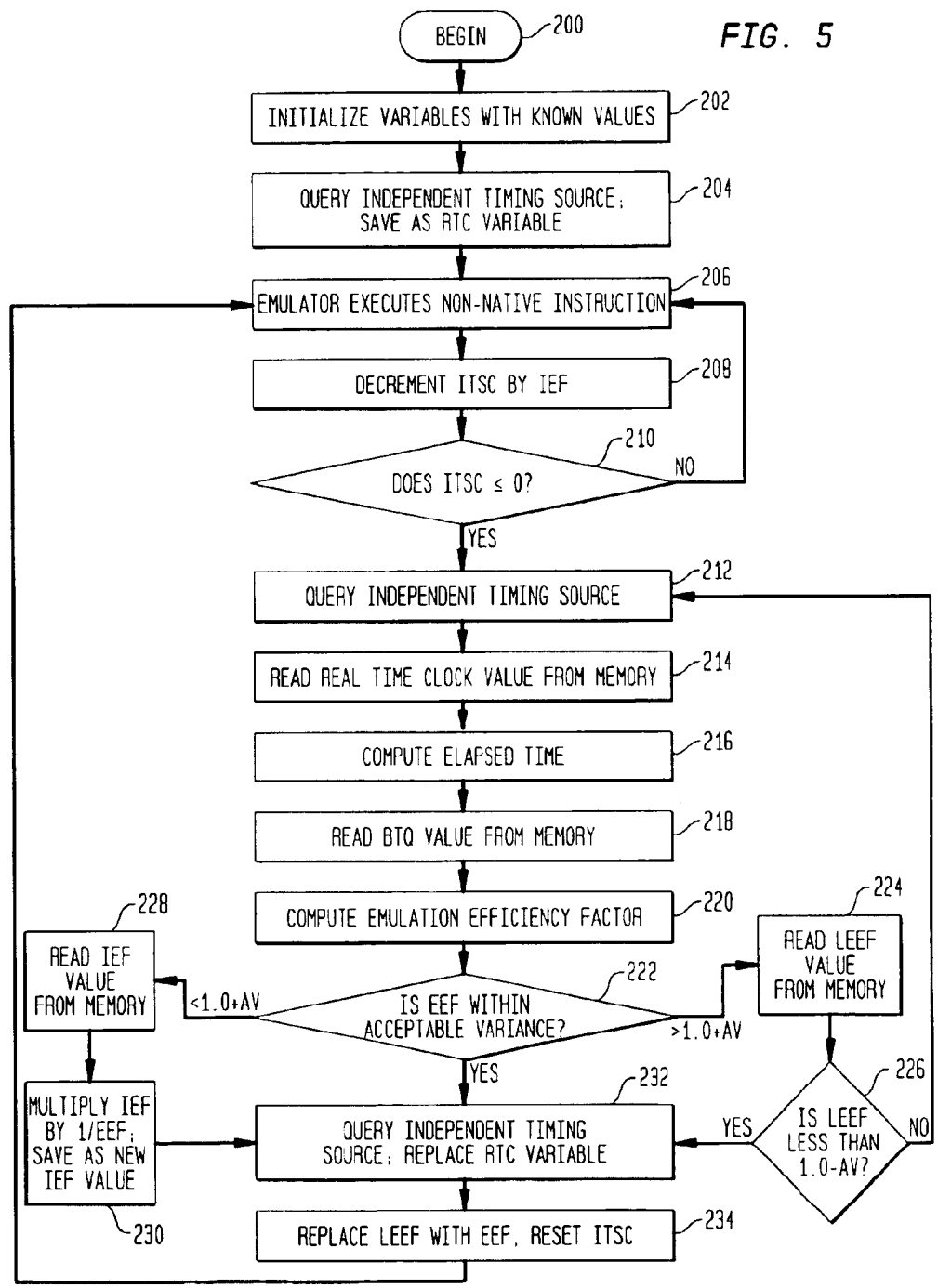
FIG. 5 shows a flow-chart of the method steps according to the present invention for measuring, predicting and adjusting for disparities in instruction execution speed according the present invention.

Referring to FIG. 5, when the host system is instructed to execute non-native code, the following variables are initialized and stored in memory via step 202: an Interrupt Time Stamp Counter (ITSC) with the BIQ as a starting value; and the Instruction Execution Factor (IEF) by which the ITSC is decremented for each non-native instruction executed on the host system. The IEF has a starting value of 1.0. A Last Emulation Efficiency Factor (LEEF) variable with a starting value of 1.0 is also initialized for later use.

In order to measure the amount of real-time it takes the host system to execute the normative code, an independent timing source that is unaffected by processor activity is queried and the result stored as the Real Time Clock (RTC) variable referred to in step 204. In many systems, there is a system clock chip which cycles at a constant rate regardless of other activity in the system; however, the timing source can be any independent source, as long as it is constant and unfettered by any loads placed on the rest of the system. For example, sound cards, video cards, even controllers for hard drives and CD-ROMs include timing circuitry which operates independently of the rest of the host system. If accessible, these sources are equally useable.

The emulation software then begins to execute the non-native code in step 206. The ITSC is decremented by the IEF value for each non-native instruction executed on the host system in step 208. When the value in the ITSC reaches zero as indicated in step 210, the execution is interrupted, results are output, and the independent timing source is queried for the Current Time as shown in step 212. In step 214, the stored RTC value is recalled from memory and subtracted from the Current Time in step 216 to determine the amount of time the host system took to process the BIQ as shown in the following Equation (2):

$$\text{Current time} - RTC = \text{Elapsed Time} \qquad (2)$$

The BTQ is recalled from memory in step 218 and divided by the Elapsed Time in step 220 to arrive at a ratio which describes the comparative speed of emulation compared to the target system as follows in Equation (3).

$$BTQ \div \text{Elapsed Time} = \text{Emulation Efficiency Factor } (EEF) \qquad (3)$$

The invention then performs a conditional query to determine whether the EEF falls within an acceptable range as indicated in step 222. An EEF of 1.0 means the host system is operating at the same speed as the target, and no adjustments are necessary. Since it is unlikely that the EEF will be exactly 1.0, the programmer or user may define an Acceptable Variance (AV) in values for the EEF. For example, an AV of ±5% of the target system would mean that EEF values of 0.95 to 1.05 would require no adjustments to emulation, thus proceeding to step 230.

If the Elapsed Time results in an EEF of less than 1.0, the host is executing instructions more slowly than the target; an EEF greater than 1.0 means the host is executing instructions faster than the target.

For example, if executing a quantity of instructions equal to the BIQ results in an Elapsed Time on the host system of 0.0111 seconds, the following results are obtained in Equation (4):

$$0.0167 \text{ (i.e., } \frac{1}{60}^{th}) \sec \div 0.0111 \sec = 1.503 \qquad (4)$$

Figure 1:
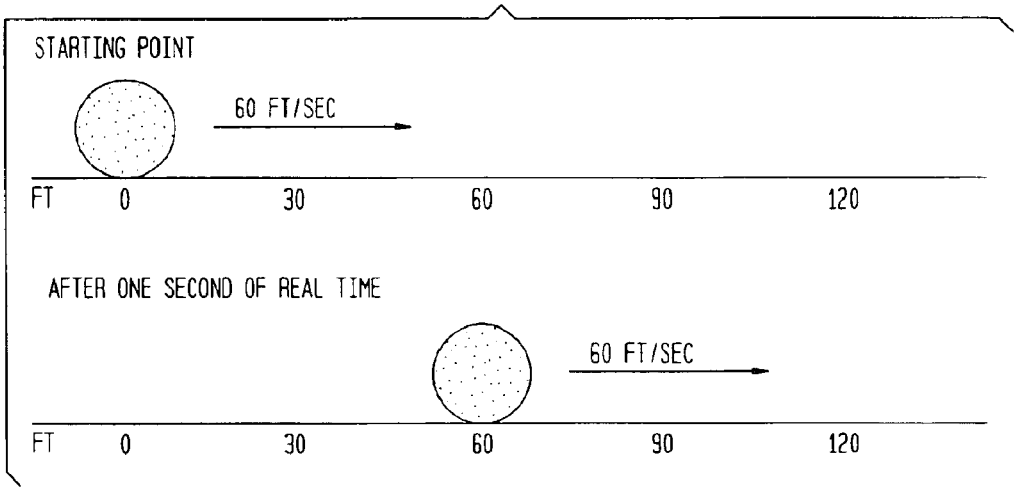
FIG. 1 shows a diagram of a display output showing an object defined on the target system that has moved after one second of real time.
Figure 2:
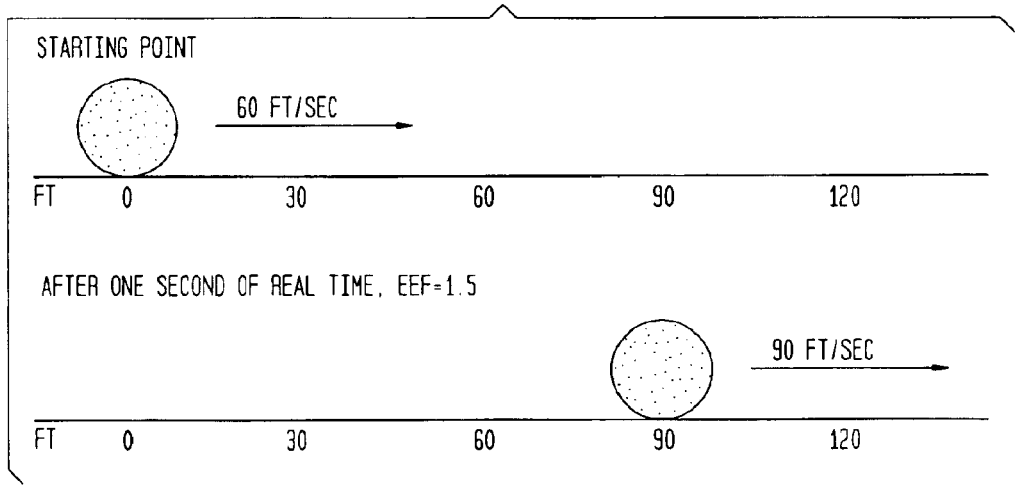
FIG. 2 shows a diagram of a display output showing an object defined on the target system that has moved in one second of real time, where the rate of instruction execution is 150%.

In this case, the host system is running 150% faster than the target. Using the example cited previously, an object moving within the virtual world at 60 ft/sec would appear to be moving at 90 ft/sec in the real world, as shown in FIG. 2.

When the EEF is greater than 1.0+AV, the stored LEEF value from the previous batch of instructions executed is recalled in step 224 and is checked to see if the value returned is less than 1.0−AV in step 226. This avoids problems with oscillation in emulation speed that can occur in a host system with variable rates of instruction execution. If the LEEF value is greater than or equal to 1.0, a wait time is introduced to compensate for the accelerated speed of the host system by returning to step 212. The timing source is again queried and the EEF is recomputed as above. This process loops until the EEF is less than 1.0. If, however, the LEEF is less than 1.0−AV, no timing adjustments are made and process continues to steps 228 and 230, where the IEF is reset to equal 1/EEF (or IEF*(1/EEF)) and saved as a new IEF value. The purpose is to "guide" the calculation of IEF towards a value that will result in a closer match between the real-world target interrupts and the "emulated-world" host interrupts. Variations in logic and execution can cause the emulation to speed up and slow down dramatically, and by settings IEF=IEF*(1/EEF), it will help to smooth the transitions. On the other hand, when the BTQ is relatively small, it is feasible to set IEF=(1/EEF) because the natural progression of smaller BTQ results in that same calculation.

In the event of too-slow performance, where the EEF is less than 1.0−AV at step 222, other actions must be taken to more closely simulate the target platform's rate of instruction execution.

There may be oscillation when odd and even groups of instructions execute too slowly and then too quickly, thereby causing both sets to be incorrect by large amounts. E.g., the first set is far too slow, so the system recalculates IEF=(1/EEF) and it becomes a large value, say 10.0. Then the system executes the next group of instructions using the new 10.0 value, but this group executes far too quickly. The system then recomputes IEF=1/EEF, and the resulting value is now 0.10. In other words, it "ping-pongs" back-and-forth because it isn't able to adjust the averages to take into consideration both groups of code.

The resulting logic of the present invention described above, is to basically bring the previous (or "last") EEF value into the system allows a smoothing out and an avoidance of the ping-pong. An alternate solution is to simply reduce the BTQ to a lower level, and thus break the individual groups into smaller pieces, which when averaged will result in far better IEF approximations.

Applying the EEF formula in this instance might mean that executing a quantity of instructions equal to the BIQ results in an Elapsed Time on the host system of 0.0223 seconds, as follows:

$$0.0167 (\frac{1}{60}^{th}) \sec \div 0.0223 \sec = 0.75 \qquad (5)$$

Figure 3:
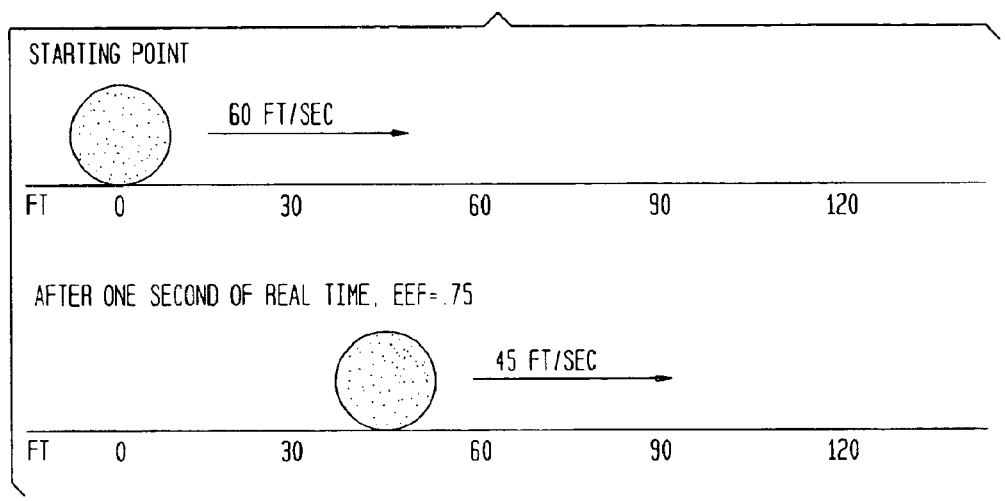
FIG. 3 shows a diagram of a display output showing an object defined on the target system that has moved in one second of real time, where the rate of instruction execution for the host system is 0.75 of the rate of the target system.

The EEF is 0.75—the host system is operating at three quarters the speed of the target, or taking one-and-one-half times more time to process the same amount of instructions. Thus, using our example, an object with a constant speed of 60 ft/sec in the virtual world would appear to move only 45 feet in the real world (FIG. 3).

To compensate for this difference, the invention will attempt to "compress time" to maximize emulation efficiency. Using the rate of instruction execution for the previous block of code as a base, performance for the next block is predicted and compensated for by changing the IEF value to 1/EEF in steps 228 and 230 for the next block of code executed. Thus, the ITSC is decremented by a greater value and generates an interrupt signal sooner, resulting in real-time output that more closely matches the virtual world.

From the above example, it can be seen that BTQ is a real-world benchmark time quantum, BIQ is a target-processor instruction quantum—for each BTQ units of time, BIQ target instructions can be executed. This is "tracked" by the host by setting the "ITSC" variable equal to BIQ at the "start" of an overall processing loop. For each target instruction that the host emulates, it will decrement the ITSC variable by the amount in IEF. When the ITSC value underflows, an "interrupt" is generated, and processing results in a reevaluation of all the parameters. If the following computations reveal that the target emulation was too slow, the IEF value will be increased (e.g., by setting it to 1/EEF), and thus each target instruction that is emulated will take a greater amount of "host emulated BTQ time" and thus cause interrupts more frequently and quickly.

This process also reduces unnecessary wait times incurred by some processors in the host system sitting dormant, waiting for the next interrupt signal. Increasing the efficiency of their operations reduces the load on other functions, resulting in greater overall emulator efficiency and timing that more closely matches the target system.

In the event that increased interrupt frequency creates a state in which the host cannot execute enough non-native commands to properly output data, it will be appreciated by one of ordinary skill in the art that secondary levels of adjustments made be performed to allow consistent timing. These actions are dependent on the nature of the target and host systems and the programs being executed. For example, an instruction could be sent to ignore processing of the next update of graphic data to the monitor, known as "frame skipping"; to place a lighter load on the system, the rate at which sound data is sampled and processed could be adjusted; similarly, video processing, display resolution, or color depth may be reduced. These adjustments, when required, are "flagged" and tracked for further optimization. It will be appreciated by one of ordinary skill in the art that these adjustments are highly variable depending upon the nature of the emulated program simulated output, and that adjustments while increasing may result in reduced output quality. For this reason, these secondary adjustments are not shown in FIG. 5.

After timing comparisons and speed adjustments, if necessary, are executed, the RTC variable is updated with the Current Time value in step 232, the ITSC variable reset with the BIQ value (for the next iteration with carryover of any underflow of the ITSC in the current iteration), and the LEEF variable is reset with the current EEF value in step 234, and the non-native code resumes execution at step 206 until the ITSC again reaches zero and the timing process repeats.

Although not shown in FIG. 5, it will be appreciated by one of ordinary skill in the art that the invention may also include optimization of the BTQ to achieve the greatest accuracy with minimal effect on the host system. At the beginning of emulation, or when the EEF falls outside of defined boundaries, the BTQ can be automatically shifted and a new corresponding BIQ calculated. In general, increasing the frequency of the timing checks and adjustments results in more consistent and accurate timing overall. When the EEF is greater than 1.0, the processor has cycles to spare and the frequency of sampling can be increased. The BTQ and corresponding BIQ will be progressively incremented until the EEF falls within the desired range or the BTQ reaches a set maximum value, beyond which further sampling produces no improvement in timing accuracy.

Similarly, if the adjusted IEF results in a condition where too many concurrent blocks of code are flagged as requiring secondary speed adjustments which may result in lower overall emulation quality, as described above, the invention will dynamically adjust the IEF to produce the optimal balance of timing accuracy and output quality within the limits of the host system.

Figure 4:
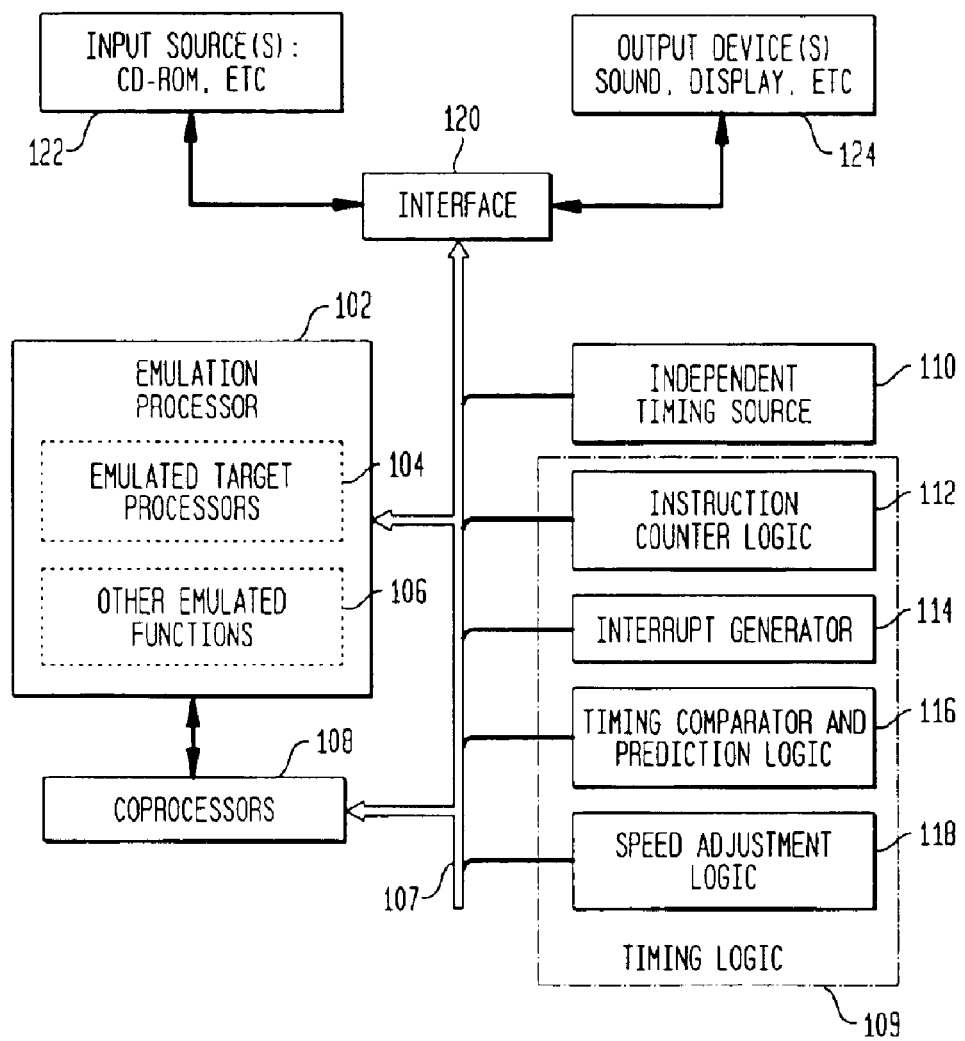
FIG. 4 shows a block diagram of the preferred embodiment of the present invention for the emulated system architecture.

Turning to FIG. 4, an embodiment of the system architecture is shown. A module 102, representing an emulator processor, includes modules 104, 106 representing functions that emulate processors of the target system. It will be appreciated by one of ordinary skill in the art that modules 104, 106 provide functionality corresponding to processors on the target system that are not present on the host system. Module 102 communicates with coprocessors 108, which reside on the host system to off-load corresponding functions of the target system. A bus 107 couples the emulation processors 102 and the coprocessors 108 both to timing logic 109 and to an independent timing source 110. It will be appreciated by those skilled in the art that independent timing source 110 is a host-resident hardware device. By contrast, timing logic 109 is preferably implemented via software and includes an instruction counter logic module 112, an interrupt generator module 114, a timing comparator and prediction logic module 116, and a speed adjustment logic module 118. Although not shown in detail in FIG. 4, an optimization 16 module for monitoring and dynamically adjusting the timing logic 109 may be included in other embodiments of the present invention.

Also coupled to bus 107 is an interface module 120 for providing input and output functions, as is conventionally known. For example, interface module 120 may be connected to input sources 122 and to output sources 124.

However, the examples of secondary adjustment and numerical values given above are merely illustrative, and the timing, prediction, and primary adjustment methods of the present invention may be modified in desired manner without departing from the scope of the invention.

What is claimed is:

1. A method for a host system to emulate execution of instructions, the instructions designed for execution by a target system, comprising the steps of:

emulating execution of the instructions by the host system at a host execution speed;

calculating a first quantity representative of a target execution speed at which the instructions are executable by said target system;

dynamically determining a variance between said first quantity and a second quantity representative of said host execution speed; and based on said dynamically determined variance, dynamically adjusting said host execution speed by dynamically increasing said host execution speed when said variance indicates that said host execution speed is less than said target execution speed, and dynamically decreasing said host execution speed when said variance indicates that said host execution speed is greater than said target execution speed.

2. The method of claim 1, wherein the step of dynamically adjusting the execution speed of said host system comprises the steps of:

pre-determining an acceptable variance between said host execution speed and said target execution speed, wherein said host execution speed is increased only when said host system is emulating execution of instructions more slowly than said target execution speed by more than said pre-determined acceptable variance, and said host execution speed is decreased only when said host system is emulating execution of the instructions more rapidly than said target execution speed by more than said pre-determined acceptable variance.

3. The method of claim 1, wherein said variance is determined as a ratio between said first quantity and said second quantity.

4. The method of claim 1, wherein said first quantity is a predetermined interval of time for which said target system is calculated to execute a predetermined number of instructions, and said second quantity is an actual amount of time used by said host system to emulate execution of a particular block of instructions containing said predetermined number of instructions.

5. The method of claim 4, wherein said host execution speed is dynamically adjusted for subsequent execution based on said variance determined for said particular block.

6. A method for simulating an operating speed of processing in an emulated target system corresponding to a rate of execution of instruction cycles on at least one host system, comprising the steps of defining a benchmark sample by selecting a reference determined by an arbitrary time quantum of said speed;

multiplying said reference by said rate of execution of instruction cycles;

tracking said instruction cycles executed and determining whether a threshold value has been exceeded;

interrupting said processing when said threshold value has been exceeded;

determining an elapsed time period by querying a timing source which is associated with the host system and unaffected by said processing;

determining a timing reference by comparing said elapsed time with said time quantum; and, using said timing reference to adjust said rate so as to simulate said operating speed of the target system.

7. A machine-readable recording medium having information recorded thereon for performing a method for a host system to emulate execution of instructions, the instructions designed for execution by a target system, the method comprising the steps of:

emulating execution of the instructions by the host system at a host execution speed;

calculating a first quantity representative of a target execution speed at which the instructions are executable by said target system;

dynamically determining a variance between said first quantity and a second quantity representative of said host execution speed; and based on said dynamically determined variance, dynamically adjusting said host execution speed by dynamically increasing said host execution speed when said variance indicates that said host execution speed is less than said target execution speed, and dynamically decreasing said host execution speed when said variance indicates that said host execution speed is greater than said target execution speed.

8. The machine-readable medium of claim 7, wherein the step of dynamically adjusting the execution speed of said host system comprises the steps of:

pre-determining an acceptable variance between said host execution speed and said target execution speed, wherein said host execution speed is increased only when said host system is emulating execution of the instructions more slowly than said target execution speed by more than said pre-determined acceptable variance, and said host execution speed is decreased only when said host system is emulating execution of the instructions more rapidly than said target execution speed by more than said pre-determined acceptable variance.

9. The machine-readable medium of claim 8, wherein said variance is determined as a ratio between said first quantity and said second quantity.

10. The machine-readable medium of claim 7, wherein said first quantity is a predetermined interval of time for which said target system is calculated to execute a predetermined number of instructions, and said second quantity is an actual amount of time used by said host system to emulate execution of a particular block of instructions containing said predetermined number of instructions.

11. The machine-readable medium of claim 10, wherein said host execution speed is dynamically adjusted for subsequent execution based on said variance determined for said particular block.

12. A host system operable to emulate execution of instructions designed for execution by a target system, said host system operable to dynamically determine a variance between a first calculated quantity representative of a target execution speed at which the instructions are executable by said target system and a second quantity representative of a host execution speed at which said host system emulates execution of the instructions, such that based on said dynamically determined variance, said host system is operable to dynamically adjust said host execution speed by dynamically increasing said host execution speed when said variance indicates that said host execution speed is less than said target execution speed, and by dynamically decreasing said host execution speed when said variances indicates that said host execution speed is greater than said target execution speed.

13. The host system of claim 12, wherein said host system is operable to dynamically adjust said host execution speed by pre-determining an acceptable variance between said host execution speed and said target execution speed, such that said host system is operable to increase said host execution speed only when said host system is emulating execution of the instructions more slowly than said target execution speed by more than said pre-determined acceptable variance, and said host system is operable to decrease said host execution speed only when said host system is emulating execution of the instructions more rapidly than said target execution speed by more than said pre-determined acceptable variance.

14. The host system of claim 13, wherein said variance is determined as a ratio between said first quantity and said second quantity.

15. The host system of claim 12, wherein said first quantity is a predetermined interval of time for which said target system is calculated to execute a predetermined number of instructions, and said second quantity is an actual amount of time used by said host system to emulate execution of a particular block of instructions containing said predetermined number of instructions.

16. The host system of claim 15, wherein said host system is operable to dynamically adjust said host execution speed for subsequent execution based on said variance determined for said particular block.

* * * * *

UNITED STATES PATENT AND TRADEMARK OFFICE
CERTIFICATE OF CORRECTION

PATENT NO. : 6,882,968 B1
DATED : April 19, 2005
INVENTOR(S) : Randal N. Linden

It is certified that error appears in the above-identified patent and that said Letters Patent is hereby corrected as shown below:

Title page,
After Item [76], Inventor, insert -- Assignee: Sony Computer Entertainment Inc. (JP) --; and
After *Primary Examiner*, insert -- *Attorney, Agent, or Firm*—Lerner, David, Littenberg, Krumholz & Mentlik, LLP --

Column 1,
Line 54, delete "@";

Column 3,
Line 44, "neon-native" should read -- non-native --; and

Column 5,
Line 9, "normative" should read -- non-native --.

Signed and Sealed this

Twelfth Day of July, 2005

JON W. DUDAS
*Director of the United States Patent and Trademark Office*